(12) United States Patent
Pope et al.

(10) Patent No.: US 9,800,513 B2
(45) Date of Patent: *Oct. 24, 2017

(54) MAPPED FIFO BUFFERING

(71) Applicant: SOLARFLARE COMMUNICATIONS, INC., Irvine, CA (US)

(72) Inventors: Steven L. Pope, Costa Mesa, CA (US); David Riddoch, Cambridge (GB); Dmitri Kitariev, Irvine, CA (US)

(73) Assignee: Solarflare Communications, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/667,295

(22) Filed: Mar. 24, 2015

(65) Prior Publication Data
US 2015/0200866 A1 Jul. 16, 2015

Related U.S. Application Data

(63) Continuation of application No. 13/070,924, filed on Mar. 24, 2011, now Pat. No. 9,008,113.
(Continued)

(51) Int. Cl.
*H04L 12/66* (2006.01)
*H04L 12/865* (2013.01)
(Continued)

(52) U.S. Cl.
CPC ........ *H04L 47/6275* (2013.01); *G06F 13/128* (2013.01); *H04L 49/3018* (2013.01); *H04L 49/3045* (2013.01)

(58) Field of Classification Search
None
See application file for complete search history.

(56) References Cited

U.S. PATENT DOCUMENTS 5,272,599 A 12/1993 Koenen
5,325,532 A 6/1994 Crosswy et al.
(Continued)

FOREIGN PATENT DOCUMENTS

EP 620521 A2 10/1994
WO 0148972 A1 7/2001
(Continued)

OTHER PUBLICATIONS

Regnier G., "Protocol Onload vs. Offload," 14th Symposium on High Performance Interconnects, Aug. 23, 2006, 1pp.
(Continued)

*Primary Examiner* — Anh-Vu Ly
(74) *Attorney, Agent, or Firm* — Haynes Beffel & Wolfeld LLP (57) ABSTRACT

A network interface device for connection between a network and a data processing system, the network interface device comprising: a plurality of ports for receiving data packets directed to the data processing system. An interface services the ports in a predetermined order and writes the data packets to buffers of a common memory. Each buffer is part of one of a set of linked logical sequence of buffers forming virtual queues in the common memory. Each virtual queue is associated with a port. A memory manager selects buffers of the common memory so as to cause the interface to populate the plurality of virtual queues with data packets.

21 Claims, 2 Drawing Sheets

Related U.S. Application Data (60) Provisional application No. 61/425,191, filed on Dec. 20, 2010.

(51) Int. Cl.
    *G06F 13/12* (2006.01)
    *H04L 12/935* (2013.01)

(56) References Cited

U.S. PATENT DOCUMENTS

| | | | |
|---|---|---|---|
| 5,946,189 A | 8/1999 | Koenen et al. | |
| 6,098,112 A | 8/2000 | Ishijima et al. | |
| 6,160,554 A | 12/2000 | Krause | |
| 6,304,945 B1 | 10/2001 | Koenen | |
| 6,349,035 B1 | 2/2002 | Koenen | |
| 6,438,130 B1 | 8/2002 | Kagan et al. | |
| 6,456,590 B1* | 9/2002 | Ren | H04L 47/10 370/229 |
| 6,502,203 B2 | 12/2002 | Barron et al. | |
| 6,530,007 B2 | 3/2003 | Olarig et al. | |
| 6,667,918 B2 | 12/2003 | Leader et al. | |
| 6,707,818 B1* | 3/2004 | Kadambi | H04L 69/161 370/391 |
| 6,718,392 B1 | 4/2004 | Krause | |
| 6,728,743 B2 | 4/2004 | Shachar | |
| 6,735,642 B2 | 5/2004 | Kagan et al. | |
| 6,768,996 B1 | 7/2004 | Steffens et al. | |
| 6,904,534 B2 | 6/2005 | Koenen | |
| 6,950,961 B2 | 9/2005 | Krause et al. | |
| 6,978,331 B1 | 12/2005 | Kagan et al. | |
| 7,093,158 B2 | 8/2006 | Barron et al. | |
| 7,099,275 B2 | 8/2006 | Sarkinen et al. | |
| 7,103,626 B1 | 9/2006 | Recio et al. | |
| 7,103,744 B2 | 9/2006 | Garcia et al. | |
| 7,136,397 B2 | 11/2006 | Sharma | |
| 7,143,412 B2 | 11/2006 | Koenen | |
| 7,149,227 B2 | 12/2006 | Stoler et al. | |
| 7,151,744 B2 | 12/2006 | Sarkinen et al. | |
| 7,216,225 B2 | 5/2007 | Haviv et al. | |
| 7,240,350 B1 | 7/2007 | Eberhard et al. | |
| 7,245,627 B2 | 7/2007 | Goldenberg et al. | |
| 7,254,237 B1 | 8/2007 | Jacobson et al. | |
| 7,285,996 B2 | 10/2007 | Fiedler | |
| 7,316,017 B1 | 1/2008 | Jacobson et al. | |
| 7,346,702 B2 | 3/2008 | Haviv | |
| 7,386,619 B1 | 6/2008 | Jacobson et al. | |
| 7,403,535 B2 | 7/2008 | Modi et al. | |
| 7,404,190 B2 | 7/2008 | Krause et al. | |
| 7,502,826 B2 | 3/2009 | Barron et al. | |
| 7,509,355 B2 | 3/2009 | Hanes et al. | |
| 7,518,164 B2 | 4/2009 | Smelloy et al. | |
| 7,551,614 B2 | 6/2009 | Teisberg et al. | |
| 7,554,993 B2 | 6/2009 | Modi et al. | |
| 7,573,967 B2 | 8/2009 | Fiedler | |
| 7,580,415 B2 | 8/2009 | Hudson et al. | |
| 7,580,495 B2 | 8/2009 | Fiedler | |
| 7,617,376 B2 | 11/2009 | Chadalapaka et al. | |
| 7,631,106 B2 | 12/2009 | Goldenberg et al. | |
| 7,650,386 B2 | 1/2010 | McMahan et al. | |
| 7,653,754 B2 | 1/2010 | Kagan et al. | |
| 7,688,853 B2 | 3/2010 | Santiago et al. | |
| 7,757,232 B2 | 7/2010 | Hilland et al. | |
| 7,782,869 B1* | 8/2010 | Chitlur Srinivasa | G06F 9/5011 370/230 |
| 7,801,027 B2 | 9/2010 | Kagan et al. | |
| 7,802,071 B2 | 9/2010 | Oved | |
| 7,813,348 B1* | 10/2010 | Gupta | H04L 12/5693 370/394 |
| 7,813,460 B2 | 10/2010 | Fiedler | |
| 7,827,442 B2 | 11/2010 | Sharma et al. | |
| 7,835,375 B2 | 11/2010 | Sarkinen et al. | |
| 7,835,380 B1 | 11/2010 | Aloni et al. | |
| 7,848,322 B2 | 12/2010 | Oved | |
| 7,856,488 B2 | 12/2010 | Cripe et al. | |
| 7,864,787 B2 | 1/2011 | Oved | |
| 7,904,576 B2 | 3/2011 | Krause et al. | |
| 7,921,178 B2 | 4/2011 | Haviv | |
| 7,929,539 B2 | 4/2011 | Kagan et al. | |
| 7,930,437 B2 | 4/2011 | Kagan et al. | |
| 7,934,959 B2 | 5/2011 | Rephaeli et al. | |
| 7,936,770 B1* | 5/2011 | Frattura | H04L 49/90 370/351 |
| 7,978,606 B2 | 7/2011 | Buskirk et al. | |
| 8,000,336 B2 | 8/2011 | Harel | |
| 9,008,113 B2* | 4/2015 | Pope | G06F 13/128 370/419 |
| 2002/0021701 A1* | 2/2002 | Lavian | H04L 12/5693 370/401 |
| 2002/0059052 A1 | 5/2002 | Bloch et al. | |
| 2002/0112139 A1 | 8/2002 | Krause et al. | |
| 2002/0129293 A1 | 9/2002 | Hutton et al. | |
| 2002/0140985 A1 | 10/2002 | Hudson | |
| 2002/0156784 A1 | 10/2002 | Hanes et al. | |
| 2003/0007165 A1 | 1/2003 | Hudson | |
| 2003/0056073 A1* | 3/2003 | Zeiger | G06F 5/065 711/170 |
| 2003/0058459 A1 | 3/2003 | Wu et al. | |
| 2003/0063299 A1 | 4/2003 | Cowan et al. | |
| 2003/0065856 A1 | 4/2003 | Kagan et al. | |
| 2003/0081060 A1 | 5/2003 | Zeng et al. | |
| 2003/0103450 A1* | 6/2003 | Chapman | H04L 12/5693 370/229 |
| 2003/0172330 A1 | 9/2003 | Barron et al. | |
| 2003/0191786 A1 | 10/2003 | Matson et al. | |
| 2003/0202043 A1 | 10/2003 | Zeng et al. | |
| 2003/0214677 A1 | 11/2003 | Bhaskar et al. | |
| 2004/0071250 A1 | 4/2004 | Bunton et al. | |
| 2004/0141642 A1 | 7/2004 | Zeng et al. | |
| 2004/0190533 A1 | 9/2004 | Modi et al. | |
| 2004/0190538 A1 | 9/2004 | Bunton et al. | |
| 2004/0190557 A1 | 9/2004 | Barron | |
| 2004/0193734 A1 | 9/2004 | Barron et al. | |
| 2004/0193825 A1 | 9/2004 | Garcia et al. | |
| 2004/0210754 A1 | 10/2004 | Barron et al. | |
| 2004/0252685 A1 | 12/2004 | Kagan et al. | |
| 2005/0008223 A1 | 1/2005 | Zeng et al. | |
| 2005/0018221 A1 | 1/2005 | Zeng et al. | |
| 2005/0038918 A1 | 2/2005 | Hilland et al. | |
| 2005/0038941 A1 | 2/2005 | Chadalapaka et al. | |
| 2005/0039171 A1 | 2/2005 | Avakian et al. | |
| 2005/0039172 A1 | 2/2005 | Rees et al. | |
| 2005/0039187 A1 | 2/2005 | Avakian et al. | |
| 2005/0066333 A1 | 3/2005 | Krause et al. | |
| 2005/0172181 A1 | 8/2005 | Huliehel | |
| 2005/0219278 A1 | 10/2005 | Hudson | |
| 2005/0219314 A1 | 10/2005 | Donovan et al. | |
| 2005/0220128 A1* | 10/2005 | Tucker | G06F 13/28 370/412 |
| 2005/0231751 A1 | 10/2005 | Wu et al. | |
| 2006/0026443 A1 | 2/2006 | McMahan et al. | |
| 2006/0045098 A1 | 3/2006 | Krause | |
| 2006/0126619 A1 | 6/2006 | Teisberg et al. | |
| 2006/0165074 A1 | 7/2006 | Modi et al. | |
| 2006/0193318 A1 | 8/2006 | Narasimhan et al. | |
| 2006/0228637 A1 | 10/2006 | Jackson et al. | |
| 2006/0248191 A1 | 11/2006 | Hudson et al. | |
| 2007/0188351 A1 | 8/2007 | Brown et al. | |
| 2007/0195761 A1* | 8/2007 | Tatar | H04L 49/1546 370/389 |
| 2007/0220183 A1 | 9/2007 | Kagan et al. | |
| 2008/0024586 A1 | 1/2008 | Barron | |
| 2008/0109526 A1 | 5/2008 | Subramanian et al. | |
| 2008/0115216 A1 | 5/2008 | Barron et al. | |
| 2008/0115217 A1 | 5/2008 | Barron et al. | |
| 2008/0126509 A1 | 5/2008 | Subramanian et al. | |
| 2008/0135774 A1 | 6/2008 | Hugers | |
| 2008/0147828 A1 | 6/2008 | Enstone et al. | |
| 2008/0148400 A1 | 6/2008 | Barron et al. | |
| 2008/0177890 A1 | 7/2008 | Krause et al. | |
| 2008/0244060 A1 | 10/2008 | Cripe et al. | |
| 2008/0301406 A1 | 12/2008 | Jacobson et al. | |
| 2008/0304519 A1 | 12/2008 | Koenen et al. | |

(56) References Cited

U.S. PATENT DOCUMENTS

| | | | |
|---|---|---|---|
| 2009/0010162 A1* | 1/2009 | Bergamasco | H04L 47/29 370/235 |
| 2009/0097495 A1* | 4/2009 | Palacharla | H04L 49/901 370/413 |
| 2009/0141720 A1 | 6/2009 | Jung et al. | |
| 2009/0165003 A1 | 6/2009 | Jacobson et al. | |
| 2009/0201926 A1 | 8/2009 | Kagan et al. | |
| 2009/0213856 A1 | 8/2009 | Paatela et al. | |
| 2009/0268612 A1 | 10/2009 | Felderman et al. | |
| 2009/0302923 A1 | 12/2009 | Smeloy et al. | |
| 2010/0067539 A1 | 3/2010 | Lin et al. | |
| 2010/0088437 A1 | 4/2010 | Zahavi | |
| 2010/0122346 A1* | 5/2010 | Tripathi | H04L 63/1458 726/25 |
| 2010/0138840 A1 | 6/2010 | Kagan et al. | |
| 2010/0169880 A1 | 7/2010 | Haviv et al. | |
| 2010/0188140 A1 | 7/2010 | Smeloy | |
| 2010/0189206 A1 | 7/2010 | Kagan | |
| 2010/0265849 A1 | 10/2010 | Harel | |
| 2010/0274876 A1 | 10/2010 | Kagan et al. | |
| 2011/0004457 A1 | 1/2011 | Haviv et al. | |
| 2011/0010557 A1 | 1/2011 | Kagan et al. | |
| 2011/0029669 A1 | 2/2011 | Chuang et al. | |
| 2011/0029847 A1 | 2/2011 | Goldenberg et al. | |
| 2011/0044344 A1 | 2/2011 | Hudson et al. | |
| 2011/0058571 A1 | 3/2011 | Bloch et al. | |
| 2011/0083064 A1 | 4/2011 | Kagan et al. | |
| 2011/0087774 A1 | 4/2011 | Pope et al. | |
| 2011/0096668 A1 | 4/2011 | Bloch et al. | |
| 2011/0113083 A1 | 5/2011 | Shahar | |
| 2011/0116512 A1 | 5/2011 | Crupnicoff et al. | |
| 2011/0119673 A1 | 5/2011 | Bloch et al. | |
| 2011/0173352 A1 | 7/2011 | Sela et al. | |

FOREIGN PATENT DOCUMENTS

| | | |
|---|---|---|
| WO | 0235838 A1 | 5/2002 |
| WO | 2008127672 A2 | 10/2008 |
| WO | 2009134219 A1 | 11/2009 |
| WO | 2009136933 A1 | 11/2009 |
| WO | 2010020907 A2 | 2/2010 |
| WO | 2010087826 A1 | 8/2010 |
| WO | 2011043769 A1 | 4/2011 |
| WO | 2011053305 A1 | 5/2011 |
| WO | 2011053330 A1 | 5/2011 |

OTHER PUBLICATIONS

Montry G., OpenFabrics Alliance presentation slides, 14th Symposium on High Performance Interconnects, Aug. 23, 2006, 8pp.
Draft Standard for Local and Metropolitan Area Networks, "Virtual Bridged Local Area Networks-Amendment XX: Edge Virtual Bridging," IEEE P802.1Qbg/D1.2, Oct. 21, 2010, 83 pp.
Draft Standard for Local and Metropolitan Area Networks, "Virtual Bridged Local Area Networks-Amendment XX: Enhanced Transmission Selection for Bandwidth Sharing Between Traffic Classes," IEEE P802.1Qaz/D2.3, Dec. 17, 2010, 105 pp.
Draft Standard for Local and Metropolitan Area Networks, "Virtual Bridged Local Area Networks-Amendment: Priority-based Flow Control," IEEE P802.1Qbb/D2.3, May 25, 2010, 40 pp.
Draft Standard for Local and Metropolitan Area Networks, "Virtual Bridged Local Area Networks-Amendment: Bridge Port Extension," IEEE P802.1Qbh/D0.5, Oct. 21, 2010, 80 pp.
Draft Standard for Information technology-Telecommunications and information exchange between systems-Local and Metropolitan Area Networks-Specific requirements, "Part 3: Carrier Sense Multiple Access with Collision Detection (CSMA/CD) Access Method and Physical Layer Specifications-Amendment: MAC Control Frame for Priority-based Flow Control," IEEE P802.3bd/D2.1, Draft Amendment to IEEE Std 802.3-2008, Jul. 14, 2010, 29 pp.
Draft Standard for Local and Metropolitan Area Networks, "Virtual Bridged Local Area Networks-Amendment 7: Congestion Management," IEEE P802.1au/D0.4, Nov. 12, 2007, 44 pp.
EP extended search report dated May 8, 2012 in EP 11 19 4603, 5 pp.
Y. Lu, R. Pan, B. Prabhakar, D. Bergamasco, V. Alaria, A. Baldini, "Congestion control in networks with no congestion drops," Proceedings of the 44th Allerton Conference on Communication, Control and Computing, Sep. 2006.
Thekkath, C. A., et al., "Implementing network protocols at user level," ACM Computer Communication Review, vol. 23, No. 4, 1993, Oct. 1993, pp. 64-73.
Singh, Raj K., et al.; Proceedings of the 1993 ACM/IEEE conference on Supercomputing, p. 452-461, Portland, Oregon, Nov. 15, 1993.
Druschel, Peter and Peterson, Larry L., ACM Operating Systems Review, vol. 27, Issue 5, p. 189-202, 1993, Dec. 1993.
Kaiserswerth, Matthias, IEEE/ACM Transactions on Networking, vol. 1, No. 6, p. 650-663, 1993, Dec. 1993.
Maeda, Chris and Bershad, Brian, ACM Operating Systems Review, vol. 27, Issue 5, p. 244-255, 1993, Dec. 1993.
Regnier, Greg, et al.; IEEE Micro, vol. 24, No. 1, p. 24-31, 1994, Jan. 1994.
Vis, J., ACM Computer Communication Review, vol. 24, No. 1, pp. 7-11, 1994, Jan. 1994.
Cohen, Danny; Finn, Gregory; Felderman, Robert; and DeSchon, Annette, "Atomic: A High Speed Local Communication Architecture," Journal of High Speed Networks, vol. 3:1 (1994), pp. 1-28.
Finn, Gregory G. and Mockapetris, Paul, "Netstation Architecture Multi-Gigabit Workstation Network Fabric," Proceedings of InterOp '94, Las Vegas, Nevada, May. 1994, 9pp.
Wray, Stuart, et al.; Proceedings of the International Conference on Multimedia Computing and Systems, p. 265-273, Boston, 1994, May. 1994.
"MPI: A Message-Passing Interface Standard," various forum members, Message-Passing Interface Forum, University of Tennessee, Knoxville, 1994, May 5, 1994 (corrected version), 239 pp.
Singh, Raj K., et al.; ACM Computer Communication Review, vol. 24, No. 3, p. 8-17, 1994, Jul. 1994.
Druschel, P., et al. "Experiences with a high-speed network adaptor: a software perspective," ACM Computer Communication Review, vol. 24, No. 4, 1994, Oct. 1994, pp. 2-13.
Floyd, Sally, ACM Computer Communication Review, vol. 24, No. 5, p. 8-23, 1994, Oct. 1994.
Edwards, A., et al.; ACM Computer Communication Review, vol. 24, No. 4, pp. 14-23, 1994, Oct. 1994.
Brakmo, L.S., et al., "TCP Vegas: new techniques for congestion detection and avoidance," ACM Computer Communication Review, vol. 24, No. 4, Oct. 1994, p. 24-35.
Romanow, A. and Floyd, S., ACM Computer Communication Review, vol. 24, No. 4, p. 79-88, 1994, Oct. 1994.
Black, R. J.; Leslie, I.; and McAuley, D., ACM Computer Communication Review, vol. 24, No. 4, p. 158-167, 1994, Oct. 1994.
Falsafi, Babak, et al.; Proceedings of the 1994 conference on Supercomputing, pp. 380-389, Washington D.C., Nov. 14, 1994.
Lin, Mengjou, et al., "Performance of High-Speed Network I/O Subsystems: Case Study of a Fibre Channel Network," Proc.1994 Conf. on Supercomputing, Washington D.C., Nov. 14, 1994, pp. 174-183.
Boden, Nanette J., et al.; Draft of paper published in IEEE Micro, vol. 15, No. 1, pp. 29-36, 1995, Nov. 16, 1994.
Sterling, Thomas, et al.; Proceedings of the 24th International Conference on Parallel Processing, pp. 11-14, Aug. 1995.
Kleinpaste, K.; Steenkiste, P.; and Zill, B., ACM Computer Communication Review, vol. 25, No. 4, p. 87-98, 1995, Oct. 1995.
Partridge, C.; Hughes, J.; and Stone, J., ACM Computer Communication Review, vol. 25, No. 4, p. 68-76, 1995, Oct. 1995.
Edwards, A. and Muir, S., "Experiences implementing a high performance TCP in user-space," ACM Computer Communication Review, vol. 25, No. 4, 1995, Oct. 1995, pp. 196-205.
Mogul, J. C., "The case for persistent-connection HTTP," ACM Computer Communication Review, vol. 25, No. 4, 1995, Oct. 1995, pp. 299-313.
Von Eicken, Thorsten, et al.; ACM Operating Systems Review, vol. 29, Issue 5, p. 109-126, 1995, Dec. 1995.

(56) References Cited

OTHER PUBLICATIONS

Tennenhouse, D. L. and Wetherall, D. J., ACM Computer Communication Review, vol. 26, No. 2, pp. 15-20, 1996, Apr. 1996.
Barham, Paul Ronald, "Devices in a Multi-Service Operating System," Ph.D. thesis, University of Cambridge, 1996, Jul. 1996, 142pp.
Chang, Chi-Chao, et al., "Low-Latency Communication on the IBM RISC System/6000 SP," Proc. 1996 ACM/IEEE conference on Supercomputing, Pittsburgh, Nov. 17, 1996, 17pp.
Touch, Joe, et al.; "Atomic-2" slides, Gigabit Networking Workshop '97 Meeting, Kobe, Japan, Apr. 1997, 10pp.
Touch, Joe, et al.; "Host-based Routing Using Peer DMA," Gigabit Networking Workshop '97 Meeting, Kobe, Japan, Apr. 1997, 2pp.
Angin, O., et al.; ACM Computer Communication Review, vol. 27, No. 3, pp. 100-117, 1997, Jul. 1997.
Thacker, Charles P. and Stewart, Lawrence C., ACM Operating Systems Review, vol. 21, Issue 4, p. 164-172, 1987, Oct. 1997.
Anderson, Ed, et al.; Proceedings of the 1997 ACM/IEEE conference on Supercomputing, p. 1-17, San Jose, California, Nov. 16, 1997.
Wassermann, Harvey J., et al.; Proceedings of the 1997 ACM/IEEE conference on Supercomputing, p. 1-11, San Jose, California, Nov. 16, 1997.
Buonadonna, Philip, et al.; Proceedings of the 1998 ACM/IEEE conference on Supercomputing, p. 1-15, Orlando, Florida, Nov. 7, 1998.
Husbands, Parry and Hoe, James C., Proceedings of the 1998 ACM/IEEE conference on Supercomputing, p. 1-15, Orlando, Florida, Nov. 7, 1998.
Warren, Michael S., et al., "Avalon: An Alpha/Linux Cluster Achieves 10 Gflops for $150k," Proc. 1998 ACM/IEEE conference on Supercomputing, Orlando, Florida, Nov. 7, 1998, 10pp.
Salmon, John, et al., "Scaling of Beowulf-class Distributed Systems," Proc. 1998 ACM/IEEE conference on Supercomputing, Orlando, Florida, Nov. 7, 1998, 18pp.
Chiou, Derek; Ang, Boon S., et al., "StarT-Voyager: A Flexible Platform for Exploring Scalable SMP Issues," Proc. 1998 ACM/IEEE conference on Supercomputing, Orlando, Florida, Nov. 7, 1998, 20pp.
Pope, S. L., et al., "Enhancing Distributed Systems with Low-Latency Networking," Parallel and Distributed Computing and Networks, Brisbane, Australia, 1998, Dec. 1998, 10pp.
De Vivo, M., et al.; ACM Computer Communication Review, vol. 29, No. 1, pp. 81-85, 1999, Jan. 1999.
Allman, M., "TCP Byte Counting Refinements," ACM Computer Communication Review, vol. 29, No. 3, 1999, Jul. 1999, pp. 14-22.
Muir, Steve and Smith, Jonathan, "Piglet: A Low-Intrusion Vertical Operating System," Technical Report MS-CIS-00-04, University of Pennsylvania, 2000, Jan. 2000, 15pp.
Crowley, Patrick, et al.; Proceedings of the 14th international conference on Supercomputing, pp. 54-65, Santa Fe, New Mexico, May 8, 2000.
Stone, Jonathan and Partridge, Craig, ACM Computer Communication Review, vol. 30, No. 4, pp. 309-319, 2000, Oct. 2000.
Feng, W. and Tinnakornsrisuphap, P., "The Failure of TCP in High-Performance Computational Grids," Proc. 2000 ACM/IEEE conference on Supercomputing, Dallas, Texas, Nov. 4, 2000, 11p.
Hsieh, Jenwei, et al., "Architectural and Performance Evaluation of GigaNet and Myrinet Interconnects on Clusters of Small-Scale SMP Servers," Proc. 2000 ACM/IEEE conference on Supercomputing, Dallas, Texas, Nov. 4, 2000, 9pp.
Pratt, Ian and Fraser, Keir, Proceedings of IEEE Infocom 2001, pp. 67-76, Apr. 22, 2001.
Moore, Gordon E., Electronics, vol. 38, No. 8, pp. 114-117, 1965, Apr. 19, 1965.
Dennis, Jack B. and Van Horn, Earl C., Communications of the ACM, vol. 9, No. 3, pp. 143-155, 1966, Mar. 1966.
Zelkowitz, Marvin, Communications of the ACM, vol. 14, No. 6, p. 417-418, 1971, Jun. 1971.
Hill, J. Carver, Communications of the ACM, vol. 16, No. 6, p. 350-351, 1973, Jun. 1973.
Kuo, F.F., "The ALOHA system," ACM Computer Communication Review, vol. 4 No. 1, 1974, Jan. 1974, pp. 5-8.
Cerf, Vinton and Kahn, Robert, IEEE Transactions on Communications, vol. COM-22, No. 5, pp. 637-648, 1974, May 1974.
Cerf, V., et al.; ACM Computer Communication Review, vol. 6 No. 1, p. 1-18, 1976, Jan. 1976.
Metcalfe, Robert M. and Boggs, David R., Communications of the ACM, vol. 19, Issue 7, pp. 395-404, 1976, Jul. 1976.
Kermani, P. and Kleinrock, L. Computer Networks, vol. 3, No. 4, pp. 267-286, 1979, Sep. 1979.
McQuillan, John M., et al.; Proceedings of the 6th Data Communications Symposium, p. 63, 1979, Nov. 1979.
Birrell, Andrew D., et al.; Communications of the ACM, vol. 25, Issue 4, pp. 260-274, 1982, Apr. 1982.
Leslie, Ian M., et al.; ACM Computer Communication Review, vol. 14, No. 2, pp. 2-9, 1984, Jun. 1984.
Nagle, John, ACM Computer Communication Review, vol. 14, No. 4, p. 11-17, 1984, Oct. 1984.
Brandriff, Robert K., et al.; "Development of a TCP/IP for the IBM/370," ACM SIGCOMM Computer Communication Review, vol. 15, No. 4, 1985, Sep. 1985, pp. 2-8.
Kline, C., "Supercomputers on the internet: a case study," ACM Computer Communication Review, vol. 17, No. 5, 1987, Aug. 1987, pp. 27-33.
Kent, Christopher A. and Mogul, Jeffrey C., ACM Computer Communication Review, vol. 17, No. 5, pp. 390-401, 1987, Oct. 1987.
Delp, Gary S., et al.; ACM Computer Communication Review, vol. 18, No. 4, p. 165-174, 1988, Aug. 1988.
Boggs, David R., et al.; ACM Computer Communication Review, vol. 18, No. 4, p. 222-234, 1988, Aug. 1988.
Kanakia, H. and Cheriton, D., ACM Computer Communication Review, vol. 18, No. 4, p. 175-187, 1988, Aug. 1988.
Jacobson, V., ACM Computer Communication Review, vol. 18, No. 4, p. 314-329, 1988, Aug. 1988.
Clark, David D., ACM Computer Communication Review, vol. 18, No. 4, pp. 106-114, 1988, Aug. 1988.
Mockapetris, Paul V. and Dunlap, Kevin J., ACM Computer Communication Review, vol. 18, No. 4, pp. 123-133, 1988, Aug. 1988.
Simmons, Margaret L. and Wasserman, Harvey J., Proceedings of the 1988 ACM/IEEE conference on Supercomputing, p. 288-295, Orlando, Florida, Nov. 12, 1988.
Borman, David A., ACM Computer Communication Review, vol. 19, No. 2, p. 11-15, 1989, Apr. 1989.
Braden, R., et al.; ACM Computer Communication Review, vol. 19, No. 2, p. 86-94, 1989, Apr. 1989.
Clark, David D., et al.; IEEE Communications Magazine, vol. 27, No. 6, pp. 23-29, 1989, Jun. 1989.
Cheriton, David R., ACM Computer Communication Review, vol. 19, No. 4, p. 158-169, 1989, Sep. 1989.
McAuley, Derek Robert, "Protocol Design for High Speed Networks," Ph.D. Thesis, University of Cambridge, 1989, Sep. 1989, 104 pp.
Partridge, Craig, ACM Computer Communication Review, vol. 20, No. 1, p. 44-53, 1990, Jan. 1990.
Clark, D. D. and Tennenhouse, D. L., ACM Computer Communication Review, vol. 20, No. 4, pp. 200-208, 1990, Sep. 1990.
Cooper, Eric C., et al.; ACM Computer Communication Review, vol. 20, No. 4, p. 135-144, 1990, Sep. 1990.
Davie, Bruce S., "A host-network interface architecture for ATM," ACM Computer Communication Review, vol. 21, No. 4, 1991, Sep. 1991, pp. 307-315.
Traw, C. Brendan S., et al.; ACM Computer Communication Review, vol. 21, No. 4, p. 317-325, 1991, Sep. 1991.
Leslie, Ian and McAuley, Derek R., ACM Computer Communication Review, vol. 21, No. 4, p. 327, 1991, Sep. 1991.
Hayter, Mark and McAuley, Derek, ACM Operating Systems Review, vol. 25, Issue 4, p. 14-21, 1991, Oct. 1991.
Finn, Gregory G., ACM Computer Communication Review, vol. 21, No. 5, p. 18-29, 1991, Oct. 1991.

(56) References Cited

OTHER PUBLICATIONS

Greg Chesson, "The Evolution of XTP," Proceedings of the Third International Conference on High Speed Networking, 1991, Nov. 1991, 10 pp.

Dixon, Michael J., "System support for multi-service traffic," University of Cambridge Computer Laboratory Technical Report No. 245, Jan. 1992, 113 pp.

Cohen, Danny; Finn, Gregory; Felderman, Robert; DeSchon, Annette; Made available by authors, Jan. 10, 1992, "Atomic: A Local Communication Network Created through Repeated Application of Multicomputing Components," 11 pp + cover.

Gene Tsudik; ACM Computer Communication Review, vol. 22, No. 5, pp. 29-38, 1992, Oct. 1992.

Steenkiste, Peter, "Analyzing communication latency using the Nectar communication processor," ACM Computer Communication Review, vol. 22, No. 4, 1992, Oct. 1992, pp. 199-209.

McKenney, Paul E. and Dove, Ken F., "Efficient demultiplexing of incoming TCP packets," ACM Computer Communication Review, vol. 22, No. 4, 1992, Oct. 1992, pp. 269-279.

Ruetsche, Erich and Kaiserswerth, Matthias, "TCP/IP on the parallel protocol engine," Proceedings of the IFIP TC6/WG6, 4 Fourth International Conference on High Performance Networking IV, Dec. 14, 1992, pp. 119-134.

Traw, C. and Smith, J., IEEE Journal on Selected Areas in Communications, pp. 240-253, 1993, Feb. 1993.

Ruetsche, E., "The architecture of a Gb/s multimedia protocol adapter," ACM Computer Communication Review, vol. 23, No. 3, 1993, Jul. 1993, pp. 59-68.

Smith, Jonathan M. and Traw, C. Brendan S., IEEE Network, vol. 7, Issue 4, pp. 44-52, 1993, Jul. 1993.

Michel, Jeffrey R., "The Design and Evaluation of an Off-Host Communications Protocol Architecture," M.Sci. Thesis, University of Virginia, 1993, Aug. 1993, 139 pp.

Hayter, Mark David , "A Workstation Architecture to Support Multimedia," Ph.D. Thesis, University of Cambridge, 1993, Sep. 1993, 111 pp.

Kay, Jonathan and Pasquale, Joseph, ACM Computer Communication Review, vol. 23, No. 4, pp. 259-268, 1993, Oct. 1993.

Leland, W. E., et al.; ACM Computer Communication Review, vol. 23, No. 4, p. 85-95, 1993, Oct. 1993.

Hrvoye, Bilic, et al.; article in Proceedings of the 9th Symposium on High Performance Interconnects, "Deferred Segmentation for Wire-Speed Transmission of Large TCP Frames over Standard GbE Networks," Aug. 22, 2001, 5pp.

Hrvoye, Bilic, et al.; presentation slides from 9th Symposium on High Performance Interconnects, "Deferred Segmentation for Wire-Speed Transmission of Large TCP Frames over Standard GbE Networks," Aug. 22, 2001, 9pp.

Lowekamp, Bruce, et al., "Topology discovery for large ethernet networks," ACM SIGCOMM Computer Communication Review—Proc. 2001 SIGCOMM conf., vol. 31, No. 4, 2001, Oct. 2001, pp. 237-248.

Shivam, Piyush, et al., "EMP: Zero-copy OS-bypass NIC-driven Gigabit Ethernet Message Passing," Proc. 2001 ACM/IEEE Conf. on Supercomputing, Denver, Nov. 10, 2001 (8 pp).

Ross, Robert, et al., "A Case Study in Application I/O on Linux Clusters," Proc. 2001 ACM/IEEE Conf. on Supercomputing, Denver, Nov. 10, 2001, 17pp.

Blanton, E. and Allman, M., "On Making Tcp More Robust to Packet Reordering," ACM Computer Communication Review, vol. 32, No. 1, 2002, Jan. 2002, pp. 20-30.

Rangarajan, Murali, et al., "TCP Servers: Offloading TCP Processing in Internet Servers. Design, Implementation, and Performance," Technical Report DCR-TR-481, Computer Science Department, Rutgers University, 2002, Mar. 2002, 14 pp.

Crowcroft, Jon and McAuley, Derek, "ATM: A Retrospective on Systems Legacy or 'A technology with a fabulous future behind it?'", ACM Computer Communication Review, vol. 32, No. 5, 2002, Nov. 2002, pp. 11-12.

Kalmanek, Charles, ACM Computer Communication Review, vol. 32, No. 5, pp. 13-19, 2002, Nov. 2002.

Smith, Jonathan, ACM Computer Communication Review, vol. 32, No. 5, pp. 29-37, 2002, Nov. 2002.

Adiga, NR, et al., "An Overview of the BlueGene/L Supercomputer," Proceedings of the 2002 ACM/IEEE conference on Supercomputing, Baltimore, Nov. 16, 2002, pp. 1-22.

Sistare, Steven J. and Jackson, Christopher J., Proceedings of the 2002 ACM/IEEE conference on Supercomputing, p. 1-15, Baltimore, Nov. 16, 2002.

Bush, R. Bush and Meyer, D., IETF Network Working Group, Request for Comments memo: 3439 [extending RFC1958], Dec. 2002, Some Internet Architectural Guidelines and Philosophy, 25 pp, The Internet Society (c)2002.

Sarolahti, Pasi, et al., "F-RTO: an enhanced recovery algorithm for TCP retransmission timeouts," ACM Computer Communication Review, vol. 33, No. 2, 2003, Apr. 2003, pp. 51-63.

Kelly, Tom, ACM Computer Communication Review, vol. 33, No. 2, pp. 83-91, 2003, Apr. 2003.

Mogul, Jeffrey C., Proceedings of HotOS IX: The 9th Workshop on Hot Topics in Operating Systems, pp. 25-30, May 18, 2003.

McAuley, Derek and Neugebauer, Rolf, "A case for virtual channel processors," NICELI '03 Proc.of the ACM SIGCOMM workshop, Aug. 2003, pp. 237-242.

Hurwitz, Justin and Feng, Wu-chun, "Initial end-to-end performance evaluation of 10-Gigabit Ethernet," Proc. 11th Symposium on High Performance Interconnects, Aug. 20, 2003, pp. 116-121.

Aggarwal, Vinay, et al., summary, NICELI workshop, ACM SIGCOMM Computer Communication Review, vol. 33, No. 5, 2003, Oct. 2003, pp. 75-80.

Feng, Wu-chun, et al., "Optimizing 10-Gigabit Ethernet for Networks of Workstations, Clusters, and Grids: A Case Study," Proceedings of the 2003 ACM/IEEE conference on Supercomputing, Phoenix, Arizona, Nov. 15, 2003, 13 pp.

Liu, Jiuxing, et al., "Performance Comparison of MPI Implementations over InfiniBand, Myrinet and Quadrics," Proc. 2003 ACM/IEEE conference on Supercomputing, Phoenix, Arizona, Nov. 15, 2003, 14 pp. 58-71.

Makineni, Srihari and Iyer, Ravi, Proceedings of the 10th International Symposium on High Performance Computer Architecture, pp. 152, Feb. 14, 2004.

Jin, Cheng, et al.; Proceedings of IEEE Infocom 2004, pp. 1246-1259, Mar. 7, 2004.

Currid, Andy, "TCP Offload to the Rescue," ACM Queue, vol. 2, No. 3, 2004, May 1, 2004, pp. 58-65.

Reginer, Greg, et al.; Computer, IEEE Computer Society, vol. 37, No. 11, pp. 48-58, 2004, Nov. 2004.

Declaration of Dr. Gregory L. Chesson in Support of Microsoft's Opposition to Alacritech's Motion for Preliminary Injunction; United States District Court, Northern District California, San Francisco Division, Case No. 3:04-cv-03284-JSW, filed Feb. 4, 2005, 289 pp. including exhibits (declaration is 25 pp).

Lazowska, Edward D. and Patterson, David A., "Computing Research: A Looming Crisis," ACM Computer Communication Review, vol. 35, No. 2, 2005, Jul. 2005, pp. 65-68.

Feng, W., et al., "Permormance characterization of a 10-Gigabit Ethernet TOE," Proc. 13th Symp. on High Performance Interconnects, Aug. 17, 2005, pp. 58-63.

Leslie, B., et al., "User-level Device Drivers: Achieved Performance," J. Comput. Sci. & Technol., vol. 20, Sep. 2005, Sep. 2005, 17pp.

Balaji, P., et al., "Head-to Toe Evaluation of High-Performance Sockets over Protocol Offload Entines," Proceedings of the IEEE International Conference on Cluster Computing, 2005, Sep. 2005, 10pp.

Kamal, Humaira, et al., "SCTP versus TCP for MPI," Proc.2005 ACM/IEEE conference on Supercomputing, Seattle, Washington, Nov. 12, 2005, 14pp.

Bhandarkar, Sumitha, et al., "LTCP: Improving the Permormance of TCP in Highspeed Networks," ACM Computer Communication Review, vol. 36, No. 1, 2006, Jan. 2006, pp. 41-50.

Chu, H. K. Jerry, "Zero-Copy TCP in Solaris," Proc. Usenix Annual Technical Conference 1996, Jan. 1996, 13pp.

(56) References Cited

OTHER PUBLICATIONS

Calvert, Ken, ACM Computer Communication Review, vol. 36, No. 2, pp. 27-30, 2006, Apr. 2006.
Crowcroft, Jon Crowcroft; ACM Computer Communication Review, vol. 36, No. 2, pp. 51-52, 2006, Apr. 2006.
Minshall, Greg, et al.; ACM Computer Communication Review, vol. 36, No. 3, pp. 79-92, 2006, Jul. 2006.
Wetherall, Davi,; ACM Computer Communication Review, vol. 36, No. 3, pp. 77-78, 2006, Ju. 2006.
Geoffray, Patrick, "A Critique of RDMA," HPCWire article, Aug. 18, 2006, 7pp. Available at http://www.hpcwire.com/hpcwire/2006-08-18/a_critique_of_rdma-1.html.
Geoffray, P., "Protocol off-loading vs on-loading in high-performance networks," 14th Symposium on High Performance Interconnects, Aug. 23, 2006, 5pp.
Sancho, Jose Carlos, et al., "Quantifying the Potential Benefit of Overlapping Communication and Computation in Large-Scale Scientific Applications," Proc.2006 ACM/IEEE conference on Supercomputing, Tampa, Florida, Nov. 11, 2006, 16pp.
Sur, Sayantan, et al.; Proceedings of the 2006 ACM/IEEE conference on Supercomputing, Tampa, Florida, Nov. 11, 2006.
Pope, Steven and Riddoch, David, ACM Computer Communication Review, vol. 37, No. 2, pp. 89-92, 2007, Mar. 19, 2007.
Mansley, Kieran, et al.; Euro-Par Conference 2007, pp. 224-233, Rennes, France, Aug. 28, 2007.
Kaiserswerth, M., IEEE/ACM Transactions in Networking vol. 1, Issue 6, pp. 650-663, 1993, Dec. 1993.
Cohen, Danny, et al.; ACM Computer Communication Review, vol. 23, No. 4, p. 32-44, 1993, Jul. 1993.
Evans, J. and Buller, T., IEEE TCGN Gigabit Networking Workshop, 2001, Apr. 22, 2001.
Wilkes, M.V. and Needham, R.M., "The Cambridge Model Distributed System," ACM SIGOPS Operating Systems Review, vol. 14, Issue 1, pp. 21-29, 1980, Jan. 1980.
Dickman, L., "Protocol Offloading vs OnLoading in High Performance Networks," 14th Symposium on High Performance Interconnects, Aug. 23, 2006, 8pp.
Mogl,., "TCP offload is a dumb idea whose time has come," USENIX Assoc., Proceedings of HotOS IX: The 9th Workshop on Hot Topics in Operating Systems, May 2003, pp. 24-30.
Petrini, F., "Protocol Off-loading vs On-loading in High-Performance Networks," 14th Symposium on High Performance Interconnects, Aug. 23, 2006, 4pp.
U.S. Appl. No. 13/070,924—Final Office Action dated Sep. 4, 2014, 10 pages.
U.S. Appl. No. 13/070,924—Response to Final Office Action dated Sep. 4, 2014, filed Dec. 4, 2014, 12 pages.
U.S. Appl. No. 13/070,924—Final Office Action dated Sep. 16, 2013, 10 pages.
U.S. Appl. No. 13/070,924—Response to Final Office Action dated Sep. 16, 2013, filed Feb. 14, 2014, 15 pages.
U.S. Appl. No. 13/070,924—Office Action dated Apr. 1, 2014, 9 pages.
U.S. Appl. No. 13/070,924—Response to Office Action dated Apr. 1, 2014, filed Aug. 1, 2014, 15 pages.
U.S. Appl. No. 13/070,924—Office Action dated Apr. 2, 2013, 45 pages.
U.S. Appl. No. 13/070,924—Response to Office Action dated Apr. 2, 2013, filed Aug. 2, 2013, 15 pages.
U.S. Appl. No. 13/070,924—Advisory Action dated Feb. 24, 2014, 3 pages.
U.S. Appl. No. 13/070,924—Notice of Allowance dated Dec. 12, 2014, 7 pages.
U.S. Appl. No. 13/070,924—Amendment After Final dated Dec. 12, 2014, 12 pages.

* cited by examiner

MAPPED FIFO BUFFERING

PRIORITY APPLICATIONS

This application is a continuation of U.S. application Ser. No. 13/070,924, filed 24 Mar. 2011 entitled Mapped FIFO Buffering, which claims the benefit of US Provisional Application No. 61/425,191, filed 20 Dec. 2010 entitled Mapped FIFO Buffering, all of which are incorporated herein by reference.

BACKGROUND OF THE INVENTION

This invention relates to a network interface device having a buffer memory shared between a plurality of physical network ports.

A network interface device (NIC) provides an interface between a physical network and a data processing system, such as a server or other computer system. The network interface allows the data processing system to transmit and receive data packets over the physical network so as to permit communication with other data processing entities on the network. In order to ensure that data packets are not dropped, a NIC must be able to receive and retain each data packet received from the network at the maximum data rate at which the network operates. This is generally achieved by providing a buffer memory for each physical data port of the NIC into which received data packets can be streamed prior to routing and/or processing by the NIC. The buffer memory available to each data port of a NIC must be sufficiently large to avoid back-pressuring incoming data streams.

Figure 1:
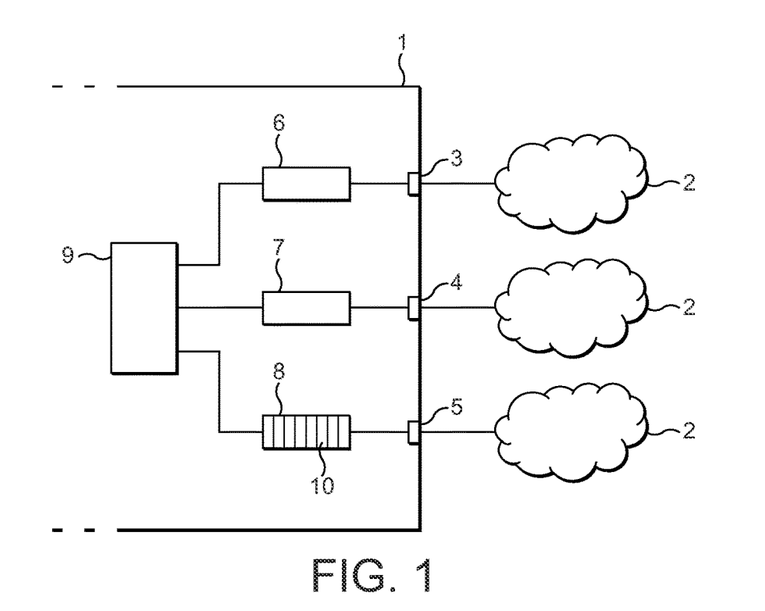
FIG. 1 is a schematic drawing of a prior art network interface device.

Conventional network interface devices provide a dedicated FIFO (first-in-first-out) memory buffer of fixed size for each physical port of the NIC. An example of this architecture is shown in FIG. 1. Network interface device 1 has three data ports 3, 4 and 5 which provide connections to networks 2 (these could be the same or different physical networks). Each data port has a dedicated FIFO memory buffer 6, 7 or 8, into which data packets received over the respective data port are streamed. The received data packets are pulled off the FIFO memory buffers by an arbitrator 9, or other entity of the network interface device, which enforces flow control and directs the packets to the appropriate processing entity of the network interface device.

Each memory buffer should be large enough so that when data packets of the maximum packet size are being received over the corresponding physical port at the maximum data rate, the memory will not become full whilst the routing and/or processing portions of the NIC are handling other memory buffers, or are otherwise not attending to the memory buffer. Other pressures act to limit the size of each memory buffer: the high speed memory required for the buffers is expensive and each additional byte of buffer memory increases the power requirements and heat generated by the NIC. These pressures are of particular concern in NICs intended for use in datacentres because such NICs are often densely packed into server racks. The size of the memory buffers provided in any given NIC is a trade-off between these competing factors.

The dedicated FIFO memory buffers of a conventional NIC each comprise a plurality of fixed-size buffers 10, which are generally designed with the intention to accommodate one packet per buffer. This simplifies the handling of received data packets and is straightforward to implement at high speed. However, the use of fixed size buffers is inefficient: if the buffers are small relative to the maximum packet size then large packets will require linking, which takes up additional memory; and if the buffers are large enough to accommodate the maximum packet size this results in unused memory when smaller data packets are received which do not fill a buffer.

A further problem with NICs having multiple physical ports is that the conventional memory buffer structure leads to poor utilisation of the total amount of buffer memory available at the NIC. In a real-world scenario it is unlikely that, from one moment to the next, all of the ports experience an equal throughput in data. The buffers corresponding to less active ports might therefore be largely empty while the buffers of more active ports become full. Because a port cannot utilise the buffers of another port, much of the expensive buffer memory provided at a NIC can go unused.

Despite these limitations, the provision of dedicated memory buffers at a NIC to handle the incoming streams of data packets from each port has become the norm. This is largely a result of the following three factors:

i. I/O bus performance between a NIC and its host system has been outstripping network performance over the last few years in terms of bandwidth and jitter, which has meant that relatively small memory buffers have been sufficient.

ii. Occasional packet loss within the NIC has historically been acceptable, particularly due to the prevalence of reliable protocols such as TCP.

iii. Most high speed NICs are designed with only two physical network ports to satisfy redundancy and failover requirements.

With the advent of higher speed 10 Gb/s Ethernet (which is moving quickly to 40 Gb/s) and new standards relating to Ethernet flow control, the demands on a NIC have changed. Some of the recent extensions to Ethernet (e.g. 802.1Qbb and 802.1Qau) relate to protocols that will not tolerate packet loss, such as Fibre Channel over Ethernet (FCoE), Infiniband, and RDMA over Converged Enhanced Ethernet. Additionally, UDP (User Datagram Protocol) is becoming increasingly used in high performance environments in which extremely low latency data transfers are required, such as high frequency stock market trading. These Ethernet extensions increase the buffering requirements at the NIC and some extensions (e.g. 802.1Qbb) require that a number of flows over an Ethernet connection are individually flow controlled, which in practice requires that each flow is provided with dedicated buffering. For example, the 802.1Qbb standard suggests that 18 KB should be set aside for each priority flow—a four-port NIC having six priority levels would therefore require 432 KB of additional buffer memory, in addition to the buffer memory used on the main data path of the NIC (typically 128 KB per port).

NICs are also becoming increasingly likely to include a greater number of physical ports, with four-port NICs becoming common. This is being driven by the increased role for NICs that have the ability to perform switching between virtualised interfaces or physical ports, possibly with packet modification on-the-fly. These changes are placing further demands on the buffering capabilities of high speed NICs.

There is therefore a need for a network interface device having a more efficient buffer memory architecture which provides improved buffer memory utilisation in real-world network conditions.

SUMMARY OF THE INVENTION

According to a first aspect of the present invention there is provided a network interface device for connection between a network and a data processing system, the network interface device comprising: an I/O interface for connection to a data processing system; a set of physical data ports for connection to a network; a unified memory comprising a plurality of buffers; a plurality of ingress ports operable to receive data packets for buffering at the unified memory, a first subset of the plurality of ingress ports being configured to receive data packets on a transmit path from said I/O interface, and a second subset of the plurality of ingress ports being configured to receive data packets on a receive path from said set of physical data ports; a memory manager configured to store representations of a plurality of virtual queues held in the unified memory, each virtual queue being a linked logical sequence of buffers of the unified memory; and an ingress interface configured to service the ingress ports in a predetermined order and write data packets received at the ingress ports to buffers of the unified memory selected by the memory manager; wherein the memory manager is arranged to select buffers of the unified memory so as to cause the ingress interface to populate the plurality of virtual queues with data packets, and the ingress interface is arranged to contiguously write data packets into the linked logical sequence of buffers representing each virtual queue.

Preferably the ingress interface is configured to delineate data packets by writing an end-of-packet control word such that each buffer can store a plurality of data packets and a single data packet can span a plurality of buffers.

Preferably the memory manager is configured to define one or more virtual queues for each ingress port such that data packets received at an ingress port are written to virtual queues associated with that ingress port.

Preferably the memory manager is configured to define for at least some of the ingress ports a plurality of virtual queues, two or more of the plurality of virtual queues having different priority levels. Preferably the ingress interface is configured to, on receiving at an ingress port a data packet that includes a priority identifier, assign the data packet to a virtual queue associated with that ingress port and having a priority level corresponding to the priority identifier.

Preferably the memory manager supports a priority lookup table defining correspondences between possible priority identifiers of data packets received at the ingress ports and the priority levels of the virtual queues, and the ingress interface is configured to, on receiving at an ingress port a data packet that includes a priority identifier, cause the priority lookup table to be accessed so as to identify the virtual queue having the corresponding priority level for that data packet. Suitably the priority identifiers are one of: Class of Service identifiers in accordance with the IEEE 802.1Qbb flow control standard; a Quality of Service parameter; and an identifier of a network endpoint having an associated priority level. Preferably, for each ingress port, the lookup table defines a one-to-one correspondence between the priority levels of the virtual queues and the Classes of Service supported by the data flows over the ingress port, with each priority level having a respective virtual queue.

The network interface device could further comprise a management controller configured to perform flow control and/or congestion avoidance mechanisms on a flow of data packets received at an ingress port of the network interface device in dependence on the number of buffers in the virtual queue associated with that ingress port and having a priority level corresponding to the priority identifiers of the data packets of the flow.

Preferably the memory manager is configured to allocate buffers not linked to a virtual queue to one or more free buffer pools and to, on a virtual queue becoming full, append a buffer selected from one of the one or more free buffer pools to that virtual queue. Preferably the one or more free buffer pools comprise a common free buffer pool, from which any of the virtual queues can receive a buffer, and for each virtual queue a private free buffer pool, from which only the respective virtual queue can receive a buffer.

Preferably the memory manager is configured to maintain for each virtual queue a common pool count of the total number of buffers added from the common pool buffer and to select a free buffer pool in accordance with the following rules: if the common buffer pool is not empty and the common pool count of the virtual queue does not exceed a predetermined common buffer pool allocation parameter, then select the common buffer pool; and otherwise select the private buffer pool of the virtual queue.

Preferably the memory manager is configured to maintain for each virtual queue a private buffer pool size parameter indicating a minimum size for the private buffer pool of the respective virtual queue, the memory manager being further configured to, on releasing a buffer from a virtual queue, allocate that buffer to the respective private buffer pool if that private buffer pool is smaller than the minimum size indicated in its private buffer pool size parameter, and otherwise allocate that buffer to the common buffer pool.

The network interface device could further comprise a management controller configured to, when a virtual queue associated with an ingress port of the second subset includes buffers from its respective private buffer pool, cause an Ethernet priority pause frame or a congestion notification message to be transmitted from the network interface device so as to reduce the rate at which data packets are received at that ingress port.

The network interface device could further comprise a management controller configured to, when a virtual queue associated with an ingress port of the first subset includes buffers from its respective private buffer pool, cause the rate at which data packets are received onto the transmit path to be throttled so as to reduce the rate at which data packets are received at that ingress port.

The network interface device could further comprise a third subset of the plurality of ingress ports configured to receive data packets from a management controller.

Preferably the memory manager is configured to maintain for each virtual queue active buffer parameters representing an active buffer to which packet data received at an associated ingress port is to be written and a write offset in the active buffer at which writing is to commence.

Preferably the buffers of the unified memory are of a fixed size and the ingress interface is configured to, on writing a data packet and if the write offset in the active buffer reaches a predetermined value indicating that the active buffer is almost full, receive from the memory manager updated active buffer parameters representing a new buffer appended to the linked logical sequence of buffers of the virtual queue to which the ingress interface is writing the data packet.

The network interface device could further comprise at least one transmit engine configured to provide data packets to the first subset of ingress ports and to one or more of the set of physical data ports of the network interface device, each transmit engine being operable to receive data over the I/O interface by means of a DMA transfer.

Preferably the ingress interface is configured to not write to the virtual queues held in the unified memory those data packets received at the first subset of ingress ports that are directed only to network endpoints accessible over the physical data ports of the network interface device.

Preferably the ingress interface is configured to write to the virtual queues held in the unified memory only those data packets received at the first subset of ingress ports that are directed to network endpoints accessible over the I/O interface of the network interface device.

Suitably at least one ingress port of the first subset receives data packets from a plurality of transmit engines.

The network interface device could further comprise a set of burst buffers arranged to buffer data packets received from the physical data ports of the network interface device.

The network interface device could further comprise an egress interface configured to service the virtual queues in sequence according to a specified service order maintained in dependence on one or both of: the number of buffers in each of the virtual queues, and a priority level of each of the virtual queues.

Preferably the egress interface is configured to promote to the head of the sequence specified in the service order those virtual queues that include buffers from their respective private buffer pool, such virtual queues having a first egress priority. Preferably the egress interface is configured to promote to the head of the sequence specified in the service order those virtual queues whose length exceeds a predetermined number of buffers but that do not include buffers from their respective private pools, such virtual queues having a second egress priority. Preferably the egress interface is configured to maintain a timer for each virtual queue, each timer indicating the length of time elapsed since the egress interface last serviced the respective virtual queue, and the egress interface is further configured to promote to the head of the sequence specified in the service order those virtual queues whose timer exceeds a predetermined timeout value, such virtual queues having a third egress priority.

Preferably, if more than one virtual queue is to be promoted to the head of the sequence specified in the service order, the virtual queues so promoted are serviced in accordance with their respective priorities, with virtual queues having a first priority being serviced before virtual queues having a second priority and virtual queues having a second priority being serviced before virtual queues having a third priority.

Suitably the egress interface is operable to promote a virtual queue so as to comply with a quality of service scheme in operation over data flows of the respective ingress port.

Preferably the egress interface is configured to, on emptying a buffer, cause the memory manager to release that buffer from the respective virtual queue.

Preferably the egress interface is configured to provide de-queued data packets to one or more receive engines of the network interface device operable to transmit data over the I/O interface by means of a DMA transfer.

Preferably each virtual queue is defined by a linked list held at a descriptor table of the memory manager.

Preferably the unified memory comprises a plurality of RAM banks configured such that data is written to the unified memory in a striped arrangement. Preferably the unified memory comprises a plurality of single port RAM cells.

According to a second aspect of the present invention there is provided a method for buffering data packets at a network interface device, the network interface device having an I/O interface for connection to a data processing system, a set of one or more physical data ports for connection to a network, a unified memory comprising a plurality of buffers and a plurality of ingress ports operable to receive data packets for buffering at the unified memory, the plurality of ingress ports including a first subset of ingress ports configured to receive data packets on a transmit path from said I/O interface and a second subset of ingress ports configured to receive data packets on a receive path from said set of physical data ports, the method comprising: servicing the ingress ports in a predetermined order so as to receive data packets from the ingress ports; selecting for each data packet received at an ingress port a buffer of a virtual queue held in the unified memory, each virtual queue being a linked logical sequence of buffers of the unified memory; and writing data packets received at the ingress ports to the selected buffers of the unified memory such that the linked logical sequence of buffers representing each virtual queue is contiguously populated with data packets.

The method could further comprise the steps of: servicing the virtual queues in sequence according to a specified service order so as to provide data packets de-queued from the virtual queues at an egress port; and directing data packets received at the egress port to one or more of: a receive engine for delivery over the I/O interface; a virtualised interface of the network interface device, and the transmit path for delivery over a physical data port of the NIC; wherein the service order is maintained in dependence on one or both of: the number of buffers in each of the virtual queues, and a priority level of each of the virtual queues.

DESCRIPTION OF THE DRAWINGS

The present invention will now be described by way of example with reference to the accompanying drawings, in which.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to an improved buffer memory architecture for a network interface device. An exemplary technique for performing flow control is also proposed. A network interface device as referred to herein can be any kind of hardware configured to interface a data processing system to a physical data network, and could be a network interface card (NIC) or a LAN-on-motherboard (LOM) device. The network interface device is connected to a data processing system by means of an I/O bus, such as a PCIe or Hypertransport data bus. The network interface device may have any number of data ports providing connections to one or more physical networks, and each data port could support a different link speed (for example 10 or 40 Gbps). A data processing system may be any kind of computer system, such as a server, network switch or personal computer. The present invention is particularly suitable for implementation at an Ethernet network interface device.

Figure 2:
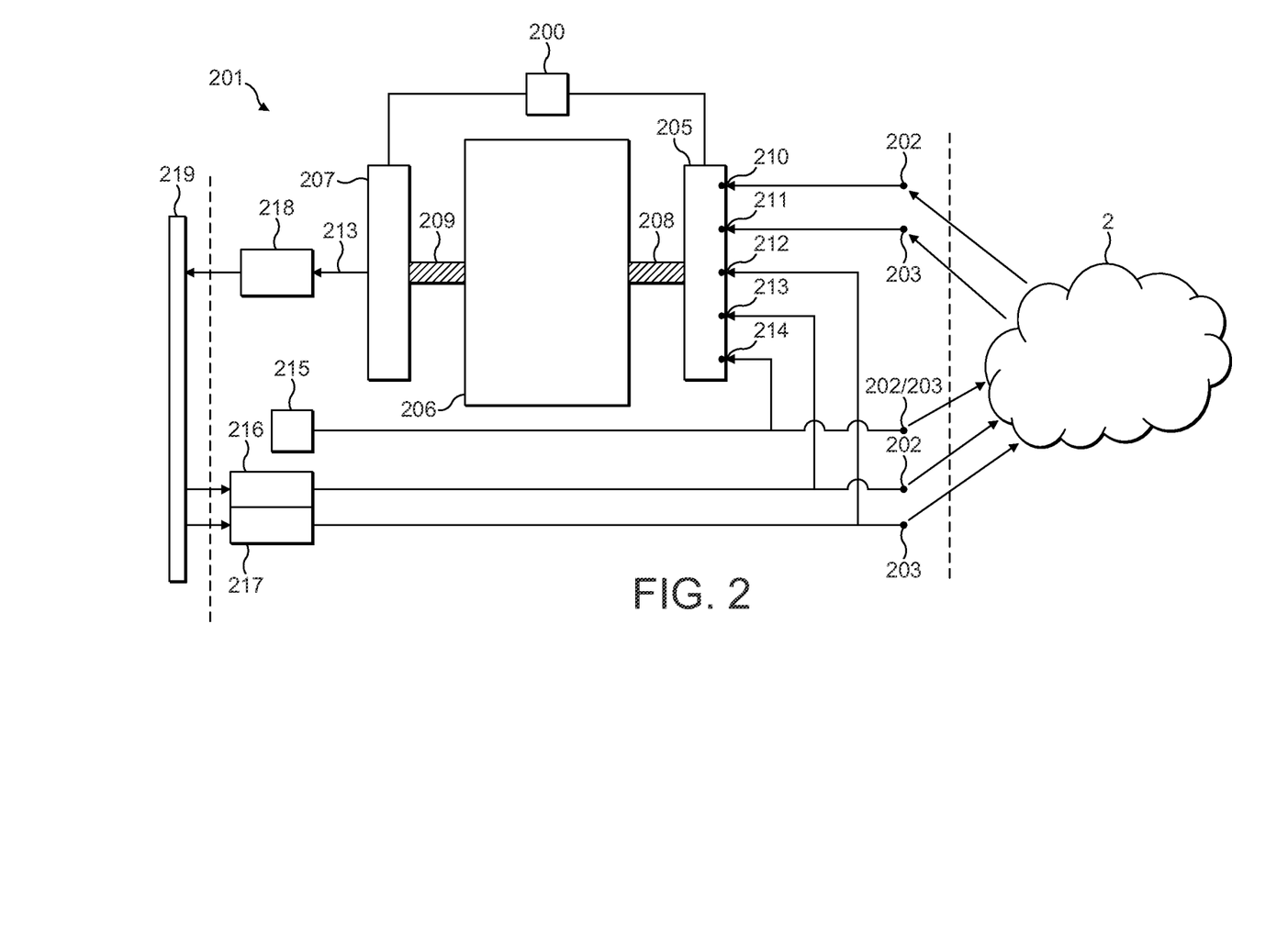
FIG. 2 is a schematic drawing of a network interface device configured in accordance with the present invention.

FIG. 2 shows a network interface device configured in accordance with the present invention. The NIC 201 has two data ports 202 and 203 over which data packets can be received from one or more networks 2 (note that the physical connectors of the data ports are not shown in the figure). NIC 201 includes a common buffer memory 206 for storing data packets received at the ingress ports 210, 211, 212, 213 and 214, with ingress ports 210 and 211 being configured to receive data packets from data ports 202 and 203 (i.e. on the receive data path), ingress ports 212 and 213 being configured to receive data packets from transmit engines 216 and 217 (i.e. on the transmit data path), and ingress port 214 being configured to receive data from a management controller 215 of the NIC.

Multiple transmit engines can be aggregated so as to provide the required bandwidth at a data port. Thus, transmit engines 216 and 217 could each comprise multiple transmit engines so as to better achieve the bandwidth available over data ports 202 and 203. Alternatively, transmit engines 216 and 217 could be aggregated so as to better achieve the bandwidth available over a single data port (i.e. data ports 202 and 203 would be the same data port). For example, NIC 201 could have two configurations: a first configuration in which data ports 202 and 203 are discrete 10G data ports driven by individual transmit engines 216 and 217; and a second configuration in which data ports 202 and 203 are a single 40G data port driven by aggregated transmit engines 216 and 217. Both configurations could be offered in the same physical NIC package—for example, the NIC could have two physical connections for the two data ports 202 and 203, with the NIC able to support 10G over both physical connections or 40G at just one of the physical connections. The NIC can therefore utilise the same transmit engines to provide multiple data port options. Note that different network data flows would generally be handled at different engines so that the data packet order within a data flow is maintained.

Common buffer memory 206 is divided into a plurality of buffers, which are units of memory in which data packets from the ingress ports are stored. The buffers are managed by memory manager 200, which logically links buffers together to create virtual FIFO queues in the common memory. The common buffer memory could comprise a plurality of physically distinct banks of memory configured for data striping such that data is written to the memory banks in a striped arrangement.

An ingress interface 205 is configured to write data packets received at its ingress ports 210-214 into the virtual queues of the common memory over ingress interconnect 208 in accordance with a predetermined ingress scheme. An egress interface 207 is configured to read the stored data packets from the virtual queues over egress interconnect 209 in accordance with a predetermined egress scheme and provide those data packets at egress port 213 for consumption by receive engine 218. There may be one or more egress ports 213 and one or more receive engines 218.

Both ingress interface 205 and egress interface 207 have access to memory manager 200 which maintains the sequences of buffers that make up each virtual queue. This ensures that the ingress interface writes to the correct buffers in the correct order and the egress interface reads from the correct buffers in the correct order. Either the memory manager or the ingress/egress interfaces maintain the state associated with writes/reads to/from the virtual queues, the state including the active write/read buffers for each queue and the write/read pointers within those buffers.

Ingress interface 205 accesses common memory 206 over interconnect 208, which may comprise any number of links over which the ingress interface can write packet data to the memory. Egress interface 207 accesses common memory 206 over interconnect 209, which may comprise any number of links over which the egress interface can read packet data from the memory.

As shown in FIG. 2, it is advantageous if the common buffer memory is a unified memory arranged to receive packet data from both the receive and transmit data paths (and optionally a management controller) of the NIC. This allows data received from transmit queues of a host for which the NIC provides an interface to the networks 2, and data received from those networks, to be handled in the same manner such that data packets from either transmit queues of the host or other hosts on the networks can be efficiently delivered into receive queues of the host. A dedicated switching mechanism for data packets that originate at a transmit queue of the host and must be delivered back into a receive queue of the host is not therefore required. A NIC configured in accordance with the present invention and having a unified memory architecture as described herein is particularly suitable for use at a blade server in which data packets often need to be switched between blades of the blade server but remain at the same host (the blade server) and at virtualised hosts supporting a plurality of virtualised operating systems each maintaining independent sets of transmit and receive queues.

Those data packets on the transmit data path that are directed to an entity on network(s) 2 are provided to data ports 202 and 203 for transmission onto the network(s). The ingress interface 205 is configured to ignore such data packets so that they are not unnecessarily stored in common memory 206. In the example in FIG. 2, two transmit channels are provided—one for each of the two data ports 202, 203 of the NIC. Generally there could be any number of data ports and any number of transmit channels, and there could be a different number of transmit channels to the number of data ports. Each data port could be coupled to a different network and/or operate at a different line speed. Typically traffic from management controller 215 should be capable of being sent over either data port, as shown in FIG. 2.

Data packets are exchanged with the host (which could be any kind of computer system, such as a blade server or virtualised server) over data bus 219, which could be, for example, a PCIe bus, an Ethernet link, or the backbone interconnect of a blade server. Most preferably data bus 219 is a switch fabric architecture. Transmit engines 216 and 217 receive data packets over the bus that are directed to their respective transmit channels. The transmit engines may be required to perform some re-framing functions of the data packets (for example, extracting Ethernet data packets from a PCIe frame) in order to prepare the data packets for transmission. It is further advantageous if the transmit engines append an info-header to data packets so as to aid the ingress interface in handling data packets received at ingress ports 212 and 213. The info-header (which could be generated during any re-framing of data packets received over bus 219) could indicate one or more of the following:

a. Whether a data packet is directed to an endpoint at the host to which the NIC is coupled; this allows the ingress interface to ignore any data packets whose info-header indicates that the data packet is not directed to an endpoint at the host. Alternatively, the transmit engines could be configured to not append an info-header to those data packets that are not directed to the host and the ingress interface could be configured to ignore any data packets not having an info-header.

b. A priority of the data packet. This could be a priority value in accordance with a particular scheme, such as an IEEE 802.1Qbb service class. The priority value presented in an info-header could be a translation of the underlying priority of the data packet according to the flow control protocols with which it is sent into one of a predetermined number of priority levels. This allows a predetermined number of virtual queues (one for each priority level) to be provided for the corresponding ingress port that can handle data packets sent in accordance with a range of different flow control protocols.

c. The length of the data packet in words. This allows the ingress interface to readily update any data counters that, for example, might keep track of the amount of data written to each virtual queue. Providing such a value can allow the ingress interface to look ahead and determine whether any additional buffers are required to store the data packet.

Transmit engines 216 and 217 are optional and might not be required if the data packets retrieved from bus 219 can be transmitted over networks 2 without further processing. The use of info-headers is also optional since the ingress interface could be configured to determine (a) to (c) above—for example, the priority class of an Ethernet data packet would be available to the ingress interface in the Ethernet header of the data packet. Alternatively the info-headers could be written to the data packets at the host, for example at a device driver or protocol stack arranged to prepare data packets for efficient handling at the ingress interface.

Thus, the present invention allows data packets directed to endpoints at a host to which the NIC is connected to be efficiently buffered together at common memory 206, irrespective of whether the data packets originated at a transmit queue of the host, at an entity on the network(s), or at a management controller of the NIC. This provides significant benefits in modern virtualised systems and blade servers in which it is generally more efficient for the NIC to perform packet switching between endpoints of the host system than for such switching to be performed external to the host at a dedicated network switch.

The memory manager defines virtual FIFO queues in common memory 206 by storing at a descriptor table a representation of the sequence of buffers that make up each queue. Each ingress port of the NIC has at least one corresponding virtual FIFO queue. It is advantageous if a plurality of virtual queues are provided for each ingress port, with each virtual queue corresponding to a different priority level. For example, the NIC shown in FIG. 2 has five ingress ports so that, if four priority levels are defined, memory manager 200 would define twenty virtual queues in common memory 206 (four queues for each ingress port). Not all ingress ports need to have the same number of virtual queues. Preferably at least one virtual queue is provided per priority level supported by the data flows received at a given ingress port.

Figure 3:
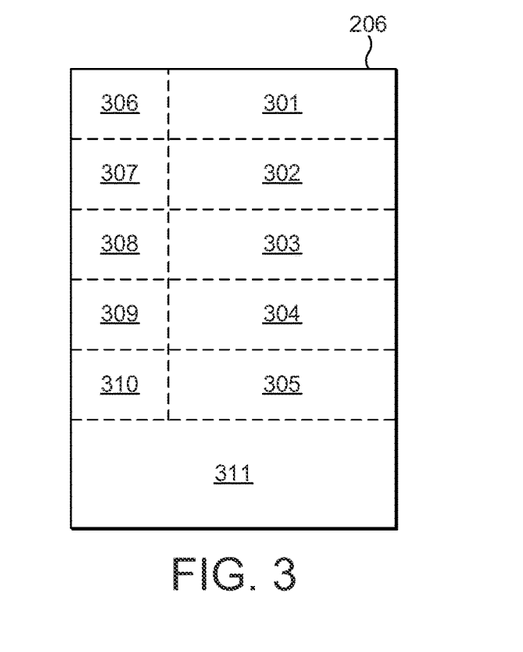
FIG. 3 is a representation of the virtual queues and buffer pools of a common buffer memory provided at a network interface device in accordance with the present invention.

A representation of the virtual FIFO queues of a memory is shown in FIG. 3, in which buffers of common memory 206 are allocated to five virtual queues 301, 302, 303, 304 and 305. To simplify the figure each virtual queue has been shown to inhabit a contiguous area of the common memory and to be of the same size. This need not be the case and in practice is unlikely to occur. A virtual queue is simply the logical ordered collection of buffers allocated to that queue.

Note that only five virtual queues have been shown in FIG. 3 which corresponds to only one queue per ingress port of the NIC shown in FIG. 2. In a more typical case in which a number of priority levels are defined for each ingress port, there would be a correspondingly greater number of virtual queues (for example, if there were four priority levels per ingress port then there would be twenty virtual queues in total).

Each virtual FIFO queue is defined in descriptor table 200 by a list of descriptor identifiers (IDs) that identify the buffers making up each of the virtual FIFO queues and the order of those buffers. The descriptor ID of a buffer may be a memory address identifying the start of that buffer in common memory 206, or another unique identifier of that buffer. Preferably each virtual FIFO queue is represented in the descriptor table as a linked list of descriptor IDs. Since the virtual queues are simply ordered sequences of buffers, virtual queues can be created and destroyed as necessary (for example, if the number of priority levels changes, or a transmit channel is disabled). The virtual queues can be managed at the host by means of a device driver of the NIC, or the virtual queues can be managed by means of a baseboard management controller at a host computer system, firmware at the NIC, or by messages transmitted from a network based management entity. A method for controlling the virtual queues of a NIC is described in co-pending U.S. patent application Ser. No. 12/900,217, which is incorporated herein by reference in its entirety.

Ingress interface 205 is configured to service the ingress ports according to a predetermined sequence and to write data packets to the corresponding virtual queues of that ingress port in accordance with the priority of the data packets. For example, if data packets received at an ingress port can have one of four priority levels (0 to 3, say) then there could be four virtual queues for that ingress port, each one associated with a different priority level, and a data packet received at that ingress port having a priority level of 2 (indicated in the packet header or in an appended info-header) would be written to the corresponding virtual queue.

The ingress interface or the memory manager preferably maintains a priority lookup table in which the ingress interface can look up the corresponding priority level and target virtual queue for a data packet received at a given ingress port and having a given priority indication.

The predetermined sequence in which the ingress ports are serviced is preferably a simple round-robin sequence, or a variant thereon, but could be any fixed sequence. In any embodiment of the present invention it could be advantageous to modify the predetermined sequence in dependence on the frequency with which data packets are received at the ingress port. The ingress ports are serviced in sequence unless a write error is encountered, in which case the ingress port that caused the write error is skipped and the next ingress port in the sequence is serviced. The ingress interface could also be configured to skip any ingress ports in the predetermined sequence which do not have data available and only service those ingress ports that have data to write into a virtual FIFO. The ingress interface could be configured to receive more than one data packet at a time from each ingress port.

Note that the order in which the data packets are received at the ingress ports need not be reflected in the order in which the data packets are written to a queue. In a preferred embodiment, the ingress interface includes a small dedicated burst buffer for each ingress port in order to smooth out short bursts of data and provide buffering in case the ingress interface is delayed accessing the ingress port. Preferably, burst buffers are provided at least for those ingress ports configured to receive incoming packet data on the receive path, and most preferably burst buffers are provided for all ingress ports, including those on the transmit path. Typically a burst buffer no larger than around 8 to 16 data packets of typical size is sufficient. The burst buffers are preferably located at the ingress interface but could alternatively be at any point between the ingress interface and physical data port. For the purposes of the present invention, when an ingress port is provided with a burst buffer, servicing the ingress port means servicing the corresponding burst buffer of the ingress port.

It will be apparent to the skilled person that many variations on the described scheme may be used. For example, the ingress interface could be configured to write more than one data packet to active virtual queue at a time, or if the NIC supports multiple physical data ports having different data transmission rates the ingress interface could be configured to service those ingress ports that receive incoming data from the higher speed physical data ports of the NIC more frequently than those ingress ports configured to receive incoming data from the lower speed data ports.

Ingress interface 205 is configured to write data received at the ingress ports to the buffers of a virtual FIFO queue in common memory 206. However, the ingress interface need not be aware of the physical or logical structure of the common memory and could be configured to write each data packet received at an ingress port to one or more buffers indicated to it by the memory manager.

The memory manager is preferably configured to maintain state identifying the currently active write buffer of each virtual queue (e.g. by means of the descriptor ID of the active write buffer) and a write pointer offset of the ingress interface in each active write buffer. The state is accessible to the ingress interface. Alternatively some or all of this state could be maintained at the ingress interface itself.

When the write pointer of the ingress interface approaches the end of a buffer, the memory manager is configured to link another buffer to the sequence of buffers defining the respective virtual queue. This can be achieved by means of the ingress interface sending a request to the memory manager in advance of reaching the end of a buffer (e.g. by a number of clock cycles equivalent to the maximum period that the memory manager might take to reply to the request) so as to cause the memory manager to link a buffer to the virtual queue. The ingress interface can determine whether a new buffer will be required from the relative write pointer offset in the active write buffer of the queue and the size of the data packet that is to be written to the queue. By arranging for the identifier of the next active write buffer to be provided in advance of reaching the end of the current active buffer, the ingress interface does not have to wait for the memory manager to reply whilst it has packet data to write to the queue.

Data packets are written to the buffers of a virtual FIFO contiguously with a predetermined control word indicating the end of each packet. In other words, data packets are not aligned to the boundaries of the buffers making up the common memory and can span one or more logically adjacent (though not necessarily physical adjacent) buffers. Thus, a data packet received at an ingress port is written to the active write buffer of the virtual FIFO queue selected by the ingress interface starting at the current write pointer offset of that buffer, which will generally correspond to the end-of-packet control word of the packet previously written to that buffer. If the size of the data packet exceeds the available space in the active write buffer, the remaining bits of the data packet when the end of the buffer is reached are written to the next buffer in the sequence of buffers identified by the memory manager as making up the virtual queue. When the end of the data packet is reached, an end-of-packet control word is written immediately after the packet data. Preferably no control words are written to delineate the end of one buffer and the start of the next. This arrangement ensures that the buffers allocated to a virtual FIFO queue are used as efficiently as possible.

In preferred embodiments in which there are two or more virtual queues for an ingress port, the ingress interface is configured to, as it writes a data packet to a buffer, peek at the next data packet at the next ingress port in the predetermined sequence in order to determine the virtual queue to which the next data packet is to be written in terms of the active write buffer and write offset in that queue. Most preferably the ingress interface is configured to determine the buffer and write offset of the virtual queue to which the next data packet is to be written at a time such that the ingress interface can commence writing the next data packet as soon as it has completed writing the current data packet. The ingress interface and common memory could be configured such that the ingress interface can concurrently write more than one data packet to the common memory.

Common memory 206 includes one or more pools of buffers which can be added to the virtual FIFO queues so as to dynamically increase the size of the queues in response to changing network conditions. These are shown in FIG. 3 as memory regions 306 to 311. The memory manager can add buffers to or remove buffers from a virtual FIFO queue by adding to or removing from the list of descriptor IDs representing that virtual FIFO in the descriptor table. In this manner, the virtual queues held in the common memory may grow or shrink under the control of the memory manager. If the virtual FIFOs are represented by a linked list in the descriptor table, buffers are added or removed from a FIFO by linking or unlinking buffers, as appropriate. In this preferred embodiment, the common buffer pool and each of the private buffer pools are represented in the descriptor table as linked lists.

The end-of-packet control words delineate the data packets held in the virtual FIFOs and allow the individual data packets be identified without there being a need to store the memory addresses at which each data packet is held in the common memory. On reading from the virtual queues, the end-of-packet control words are used by egress interface 207 to identify the individual data packets in the stream of read packet data.

It is advantageous if the descriptor table 200 is embodied in a random access memory (RAM) that is not accessed over the same interface as the common memory (which uses interface 208). Preferably the RAM is single port RAM. The descriptor table could be distinct from the memory manager and/or directly accessible to one or both of the ingress and egress interfaces without accesses being mediated by the memory manager. In less preferred embodiments, the descriptor table could be held in common memory 206.

An exemplary scheme for managing the virtual queues of common memory 206 will now be described. A representation of the allocation of buffers under this scheme is shown in FIG. 3, with memory areas 306 to 310 representing private buffer pools for virtual queues 301 to 305, respectively, and memory area 311 representing a common buffer pool. Buffers held in the common buffer pool may be allocated to any of the virtual queues but buffers held in each queue's private pool can be allocated only to the respective virtual queue. By arranging for the buffers in the common pool to be allocated to the virtual queues before the buffers in the private pools, a mechanism is provided by which the NIC can determine when a queue is becoming full: when a virtual queue requires buffers from its private pool (because it has consumed its allocation of buffers from the common buffer pool) the virtual queue is approaching its maximum size and can be said to be at its almost-full threshold. This information is useful in enforcing flow control and enables the NIC to handle data flows in accordance with their relative priorities, as will be described below.

The number of common pool buffers allocated to a particular virtual FIFO is preferably stored as a count at the memory manager, with the respective count being incremented each time a buffer is allocated to a virtual FIFO and decremented each time a buffer is de-allocated from a virtual FIFO. This allows the memory manager to keep track of how many buffers each virtual FIFO has allocated from the common buffer pool.

Preferably the memory manager is configured to, for each virtual queue, control the allocation of buffers from the common and private buffer pools in accordance with a set of predetermined parameters. These parameters may be the same for each queue or can be maintained individually for each of the queues of the system. The latter is preferably the case with the parameters being maintained as state for each respective queue by the memory manager. The parameters include the minimum size of the private buffer pool of a queue and the maximum number of buffers from the common buffer pool that can be allocated to a queue. Most preferably the parameters are programmable by the host (for example by means of a device driver) along with other parameters such as the number of queues, the number of priority levels, the size of the buffers etc.

It is advantageous if the private buffer pool for each virtual FIFO has a predetermined minimum size and is maintained at this size by the memory manager. Preferably this minimum size is no less than the largest packet size received at the network interface device plus one buffer. This ensures that a virtual FIFO can always add a number of buffers sufficient to hold any data packet received over the network.

It is also advantageous if there is a maximum number of buffers (maintained as a parameter by the memory manager) that each virtual FIFO can borrow from the common buffer pool. This ensures that the each queue does not grow overly large, potentially at the expense of the other queues of the system.

By way of example, the linking and unlinking of buffers to and from virtual queues could be controlled by the memory manager in accordance with the following rules:
(i) If the common buffer pool is not empty and the total number of common pool buffers held by a particular FIFO does not exceed its predetermined maximum value, then new buffers are taken from the common buffer pool. Otherwise buffers are taken from the private buffer pool of that virtual FIFO.
(ii) If the private buffer pool of a queue is smaller than its predetermined minimum size then buffers released from the queue are allocated to the private buffer pool. Otherwise released buffers are allocated to the common buffer pool.

When releasing multiple buffers from a queue, it can be more efficient in terms of processing overhead at the memory manager to release all of the available buffers in a single operation. In such embodiments, the available buffers are released in a chain to either the common pool or the relevant private buffer pool in accordance with the rules enforced by the memory manager (for example (i) and (ii) above). However, it is advantageous to maintain the size of the private buffer pools at or close to its minimum size so as to ensure that the common buffer pool is as large as possible. This allows the size of the queues to remain fluid even when some of the queues are growing large. It can therefore be useful to modify rule (i) above: if a private queue becomes more than a predetermined amount larger than its minimum size as stipulated in the parameters of that queue, then buffers are taken from the private pool rather than the common pool until the private pool reaches its minimum size.

The above scheme ensures that when a queue is almost full (i.e. it has depleted its allowance of buffers from the common buffer pool) the virtual queue can still grow by at least the number of buffers held in its private buffer pool. Thus, the architecture can indicate to the NIC when a queue has reached its almost-full threshold, yet allows the queue to continue accepting data packets since the queue can always expand by the size of the largest allowed data packet.

The memory manager can determine when a queue reaches its almost-full threshold from the count of the number of buffers allocated to the queue from its private pool: i.e. a queue has reached that threshold when its count is equal to the maximum number of buffers that the queue can borrow from the common pool. Alternatively the memory manager could determine when a queue reaches this threshold from the total number of buffers it is allocated.

The egress interface 207 is configured to read data packets from the virtual FIFO queues over interconnect 209 and push the data packets out over egress port 213 to bus 219, optionally by means of receive engine 218. Like the ingress interface, the egress interface does not modify the data packets. However, unlike the ingress interface, the egress interface services the virtual FIFO queues according to a predetermined queue sequence modified in dependence on the fullness of those queues. It is efficient if the memory manager maintains as state for each virtual queue a count of the length of the virtual queue in terms of the number of buffers that the virtual queue comprises. This allows the egress interface to determine which of the queues should be next serviced by accessing that state. Virtual queue state could be stored at the memory manager and/or the egress and ingress interfaces.

The egress interface is configured to periodically determine which of the queues should be next serviced after a predetermined number of packets have been read, and preferably the next active read buffer is determined as the previous data packet is being read, or earlier. As it reads packet data from the active read buffer, the egress interface can determine when it reaches the end of a data packet from the control word written by the ingress interface indicating the end of a data packet. Preferably the egress interface is configured to only service virtual FIFOs that are at least one buffer long. This ensures that reads and writes are not performed on the same buffer and avoids the unnecessary servicing of almost empty queues.

The memory manager is preferably configured to maintain state for each virtual queue that identifies the active read buffer (e.g. by means of the descriptor ID of the active read buffer) and the read pointer offset of the egress interface in that active read buffer. This state is accessible to the egress interface so as to allow it to determine the point from which it should start reading from each virtual queue. Alternatively some or all of this state could be maintained at the egress interface itself.

When the read pointer of the egress interface approaches the end of a buffer, the memory manager is configured to unlink that buffer from the sequence of buffers defining the respective virtual queue. This can be achieved by means of the egress interface sending a request to the memory manager in advance of reaching the end of a buffer (e.g. by a number of clock cycles equivalent to the maximum period that the memory manager might take to reply to the request) so as to cause the memory manager to unlink the buffer from the virtual queue. The memory manager and egress interface are configured such that, if a data packet being read spans more than one buffer, the egress interface is provided with an identifier of the next buffer in which data of that data packet is found in advance of reaching the end of the current active buffer.

The egress interface is configured to service the virtual queues in accordance with an underlying predetermined sequence, which is preferably a round-robin sequence or a derivative. However, the sequence in which the queues are serviced is modified in dependence on the fullness of the virtual queues as set out below:
(i) Queues which have used up their allowance of buffers from the common buffer pool and have therefore reached the "almost full" threshold are assigned a first egress priority;
(ii) Queues which have exceeded a predetermined length are assigned a second egress priority: the predetermined length is chosen to be less than the length of the queue when its allowance of buffers from the common buffer pool has been used up;
(iii) Each queue is also assigned a timeout period between accesses by the egress interface: when the timeout expires for a particular queue, that queue is assigned a third egress priority. This is to avoid introducing excessive data latencies. In order to determine whether the timeout of a queue has expired, the egress interface monitors the time elapsed between accesses to each of the queues by means of a timer maintained for each queue. The timers are preferably established at the egress interface (or a FIFO arbiter). When a timer reaches its timeout value, that queue is flagged as belonging to the third priority level.

Thus the egress interface is configured to preferentially de-queue data packets from the virtual queues that are almost full so as to prevent data packets being dropped. The order in which the virtual queues are serviced can be determined from the state of the virtual queues and in particular the count data identifying the number of buffers allocated to each virtual queue from the common buffer pool and its private buffer pool.

In order to comply with the various priority schemes that might be in use over the data flows handled by the network interface device, it can be advantageous to promote the priority level of high priority queues so as to ensure that those queues are preferentially serviced even if they have not reached their almost-full threshold. Alternatively, high priority queues are specified to have a small allowance of buffers from the common buffer pool in comparison to low priority queues so as to cause the high priority virtual queues to be serviced such that high priority data packets passing through the unified memory experience lower latency. A network interface device configured in accordance with the present invention will typically be capable of enforcing several different scheduling policies. The particular scheduling policies in use typically depends on the communication protocols in use over the network.

The egress interface or a discrete FIFO arbiter (not shown in the figures) to which the egress interface has access maintains the order in which queues are to be accessed and, in the absence of any queues being promoted to one of the three egress priorities, the queues will continue to be serviced in this order. When one of the queues is assigned to one of the above three egress priorities then that queue is promoted to be next serviced by the egress interface. If multiple queues are assigned to one of the above three egress priorities then the queues are accessed in accordance with the relative order of the priorities, with the first egress priority being the highest and the third egress priority being the lowest. In other words, the egress interface (or a discrete FIFO arbiter) updates the order in which the queues are accessed to reflect the priority levels of the queues.

By ensuring that the virtual queues are serviced in accordance with the above priority scheme, the usage of private pool buffers (and hence the degree of back-pressuring) is minimised and data is de-queued from the virtual queues within acceptable limits of latency.

The egress priority of each queue can be stored in the state of each virtual queue and/or at the egress interface (or FIFO arbiter), with the sequence in which the queues are to be serviced being continuously updated. As the egress interface reads each data packet from the common memory virtual queue, it determines the active read buffer and read pointer of the virtual queue indicated as being next in the sequence to be serviced. The egress interface could determine the active read buffer and read offset of the next queue by querying the memory manager.

As the egress interface empties packet data from the buffers of a virtual queue it causes the free buffers to be released back into one of the free buffer pools in accordance with the buffer management scheme in use.

In order to avoid delays in the egress interface receiving the next active buffer ID, it is preferable for the egress interface to request that the active read buffer is freed when its read pointer is within a predetermined number of clock cycles of reaching the end of the buffer. Most preferably such requests are made prior to the egress interface reaching the end of the buffer by a period at least equivalent in length to the maximum number of clock cycles that the memory manager could take to free the current active read buffer and respond to the egress interface with the next active read buffer. However, if the memory manager responds in less time than the maximum, unread data packets could be left in the buffer when unlinked from the queue. It is therefore advantageous if the egress interface includes a burst buffer into which data is buffered into from an active read buffer, the burst buffer being at least equal in size to the amount of data remaining in an active read buffer when the egress interface is configured to request that the memory manager release the buffer.

It can be advantageous if a receive engine 218 is configured to receive data packets from the egress port 213 and push data packets onto bus 219. The receive engine might be required to strip an info-header appended to data packets that have passed through transmit engines 216 or 217. The receive engine could also perform address translation and multicasting of data packets to endpoints at the host.

Data packets that pass through the virtual queues of the unified buffer could be directed to one or more of: receive queues of the host, virtual interfaces of the NIC, and remote entity on the network. Data packets directed to the host would be injected onto a receive path of the NIC for delivery by the receive engine into a receive queue, and data packets directed to a remote entity would be injected onto a transmit path of the NIC for delivery by a transmit engine to a physical data port of the NIC. Data packets could also be re-circulated back into the unified buffer for subsequent direction to a host, VNIC or remote entity. Such direction of data packets received from the unified buffer may be performed at the egress interface or receive engine, with the direction being performed in dependence on the network endpoints indicated in the data packets and other packet header identifiers.

It is advantageous if a set of virtual queues of different priority levels are provided for each ingress port since this allows the NIC to efficiently enforce flow control or congestion avoidance mechanisms such as IEEE 802.1Qau and 802.1Qbb, as well as more recent congestion control algorithms based on queue theory such as Fast TCP and the Backward Congestion Notification algorithm described by Lu et al. in a paper entitled "Congestion control in networks with no congestion drops" (available at http://www.ieee802.org/1/files/public/docs2006/au-Lu-et-al-BCN-study.pdf).

By grouping packets in virtual queues according to their priority level, the occupancy of the virtual queues can be used to control the generation of per-priority PAUSE frames in accordance with IEEE 802.1Qbb and/or congestion notification messages in accordance with IEEE 802.1Qau. Preferably a priority queue is determined to be overfull and hence data is arriving at its associated data flows at too fast a rate when that virtual queue reaches an almost-full threshold, which occurs when the queue has used up its allocation of buffers from the common pool. The almost-full threshold can be determined from state maintained by the memory manager that indicates the buffer counts of the virtual queues held in the common memory. For the virtual queues of an ingress port on the receive data path, the NIC can be configured to cause the generation of an 802.1Qbb PAUSE frame (generally at the link layer protocol stack) for transmission over the appropriate network in order to indicate to other devices on the network that the transmission of data to the NIC should be paused or reduced in rate. This helps to avoid data packet loss, which is becoming increasingly important in high speed network architectures.

For the virtual priority queues of an ingress port on the transmit data path, the occupancy of the virtual queues can be used to control the generation of congestion notification messages in accordance with IEEE 802.1Qau and/or cause the rate at which data packets are pulled from the transmit queues of the host to be throttled-back or paused. Thus, when a virtual queue on the transmit path reaches an almost-full threshold, the NIC can be configured to cause the generation of a congestion notification message for transmission to upstream network entities on data flows associated with that virtual queue (i.e. data flows of the corresponding priority level). This is appropriate for data flows for which the NIC is behaving as a switch.

For data flows originating at the host it is more appropriate for the rate at which data packets are pulled from the transmit queues of the host to be throttled-back or paused when the corresponding virtual queue reaches an almost-full threshold. This helps to reduce the flow of data packets into the common memory and avoid data packet loss due to overflow. Advantageous methods for pacing data packets from the transmit queues of a host are described in U.S. Pat. No. 7,596,644, which is incorporated herein by reference in its entirety.

In embodiments of the present invention, the ingress interface could be configured to write more than one data packet at one time and/or the egress interface could be configured to read more than one data packet at one time. Alternatively, there could be multiple ingress and/or egress interfaces each being configured to process one data packet at a time so as to achieve writing and/or reading multiple data packets at a time.

Note that in order to avoid back-pressuring the incoming data channels, the bandwidth of interconnects 208 and 209 should be sufficient to cope with the influx of data should the data throughput rates at each of the ingress ports simultaneously reach their maximum.

Due to the parallel configuration of the ingress and egress interfaces, it is advantageous if the common memory is implemented as single port RAM. This minimises the size and power requirements of the memory and allows a lower system clock to be used than would be the case with dual port RAM. In such embodiments, the ingress and egress interfaces are preferably clocked such that the two interfaces alternately write and read (as appropriate) to and from the buffers of the common memory.

The terms "set" and "subset" as used herein refer to groups of one or more entities. For example, a subset of ingress ports should be understood to refer to a group of one or more ingress ports. A network endpoint is an entity to which network data packets are directed, such as a receive queue of a host computer system or a remote computer system. Network endpoints can be identified by, for example, network addresses such as IP or Ethernet addresses.

A network interface device configured in accordance with the present invention could additionally include some ports which use a conventional dedicated FIFO for each data port that provides incoming data packets directly to subsequent packet-handling entities on the receive-side of the NIC, bypassing the virtual FIFO structure described herein.

The memory manager, ingress interface and egress interface are shown as distinct entities in FIG. 2 but the functions of the memory manager could in fact be performed at the ingress and egress interfaces. The ingress interface might not in fact be a single interface but there could be an individual ingress interface for each ingress port.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A network interface device for connection between a network and a data processing system, the network interface device comprising:
 a common memory configured to buffer data packets;
 a plurality of ports operable to receive data packets for writing to the common memory;
 a memory manager configured to store information defining a plurality of virtual queues held in the common memory, wherein the memory manager is configured to associate one or more of the virtual queues with each port such that data packets received at a port are written to the one or more virtual queues associated with that port, wherein a linked logical sequence of buffers in said common memory represents each virtual queue; and
 an interface configured to:

receive from the memory manager an indication of one or more buffers for each linked logical sequence of buffers representing a virtual queue; and service the ports and write data packets received at a respective port into the indicated one or more buffers of the linked logical sequence of buffers representing a virtual queue associated with that port.

2. A network interface device as claimed in claim 1, wherein the memory manager is configured to define for at least some of the ports a plurality of virtual queues, two or more of the plurality of virtual queues having different priority levels.

3. A network interface device as claimed in claim 2, wherein the interface is configured to, on receiving at a port a data packet that includes a priority identifier, assign the data packet to a virtual queue associated with that port and having a priority level corresponding to the priority identifier.

4. A network interface device as claimed in claim 3, wherein the memory manager supports a priority lookup table defining correspondences between possible priority identifiers of data packets received at the ports and the priority levels of the virtual queues, and the interface is configured to, on receiving at a port a data packet that includes a priority identifier, cause the priority lookup table to be accessed so as to identify a virtual queue having the corresponding priority level for that data packet.

5. A network interface device as claimed in claim 4, wherein the priority identifiers are one of: Class of Service identifiers in accordance with the IEEE 802.1Qbb flow control standard; a Quality of Service parameter; and an identifier of a network endpoint having an associated priority level,
wherein, for each port, the lookup table defines a one-to-one correspondence between the priority levels of the virtual queues and the Classes of Service supported by the data flows over the port, with each priority level having a respective virtual queue.

6. A network interface device as claimed in claim 3, further comprising a management controller configured to perform flow control and/or congestion avoidance mechanisms on a flow of data packets received at a port of the network interface device in dependence on the number of buffers in a virtual queue associated with that port and having a priority level corresponding to the priority identifiers of the data packets of the flow.

7. A network interface device as claimed in claim 1, further comprising a third subset of the plurality of ports configured to receive data packets from a management controller.

8. A network interface device as claimed in claim 1, further comprising:
an I/O interface for connection to the data processing system; and
a set of physical data ports for connection to the network, wherein a first subset of the plurality of ports are configured to receive data packets on a transmit path from said I/O interface, and a second subset of the plurality of ports being configured to receive data packets on a receive path from said set of physical data ports, the network interface device further comprising:
at least one transmit engine configured to provide data packets to the first subset of ports and to one or more of the set of physical data ports of the network interface device, each transmit engine being operable to receive data over the I/O interface of the network interface device by means of a DMA transfer,
wherein the interface is configured to not write to the virtual queues held in the common memory those data packets received at the first subset of ports that are directed only to network endpoints accessible over the physical data ports of the network interface device.

9. A network interface device as claimed in claim 8, wherein the interface is configured to write to the virtual queues held in the common memory only those data packets received at the first subset of ports that are directed to network endpoints accessible over the I/O interface of the network interface device.

10. A network interface device as claimed in claim 1, further comprising:
a set of physical data ports for connection to the network; and
a set of burst buffers arranged to buffer data packets received from the physical data ports of the network interface device.

11. A network interface device as claimed in claim 1, further comprising an egress interface configured to service the virtual queues in sequence according to a specified service order maintained in dependence on one or both of: the number of buffers in each of the virtual queues, and a priority level of each of the virtual queues.

12. A network interface device as claimed in claim 11, wherein the egress interface is configured to promote to the head of the sequence specified in the service order those virtual queues that include buffers from their respective private buffer pool, such virtual queues having a first egress priority.

13. A network interface device as claimed in claim 12, wherein the egress interface is configured to promote to the head of the sequence specified in the service order those virtual queues whose length exceeds a predetermined number of buffers but that do not include buffers from their respective private pools, such virtual queues having a second egress priority.

14. A network interface device as claimed in claim 13, wherein the egress interface is configured to maintain a timer for each virtual queue, each timer indicating the length of time elapsed since the egress interface last serviced the respective virtual queue, and the egress interface is further configured to promote to the head of the sequence specified in the service order those virtual queues whose timer exceeds a predetermined timeout value, such virtual queues having a third egress priority.

15. A network interface device as claimed in claim 14, wherein, if more than one virtual queue is to be promoted to the head of the sequence specified in the service order, the virtual queues so promoted are serviced in accordance with their respective priorities, with virtual queues having a first priority being serviced before virtual queues having a second priority and virtual queues having a second priority being serviced before virtual queues having a third priority,
wherein the egress interface is operable to promote a virtual queue so as to comply with a quality of service scheme in operation over data flows of the respective port.

16. A network interface device as claimed in claim 11, wherein the egress interface is configured to, on emptying a buffer, cause the memory manager to release that buffer from the respective virtual queue.

17. A network interface device as claimed in claim 11, wherein the egress interface is configured to provide de-queued data packets to one or more receive engines of the network interface device operable to transmit data over an I/O interface of the network interface device by means of a DMA transfer.

18. A network interface device as claimed in claim 1, wherein each virtual queue is defined by a linked list held at a descriptor table of the memory manager.

19. A network interface device as claimed in claim 1, wherein the common memory comprises a plurality of RAM banks configured such that data is written to the common memory in a striped arrangement or a plurality of single port RAM cells.

20. A method for buffering data packets at a network interface device connecting a data processing system to a network, the network interface device comprising a common memory configured to buffer data packets, a plurality of ports operable to receive data packets for writing to the common memory, and a memory manager, the method comprising:

storing in the memory manager, information defining a plurality of virtual queues held in the common memory, wherein the memory manager is configured to associate one or more of the virtual queues with each port such that data packets received at a port are written to the one or more virtual queues associated with that port, wherein a linked logical sequence of buffers in said common memory represents each virtual queue;

receiving from the memory manager an indication of one or more buffers for each linked logical sequence of buffers representing a virtual queue; and     servicing the ports and writing data packets received at a respective port into the indicated one or more buffers of the linked logical sequence of buffers representing a virtual queue associated with that port.

21. A non-transitory computer readable storage medium configured to store instructions which, when executed on one or more processors of a network interface device connecting a data processing system to a network, cause a method to be performed, the network interface device comprising a common memory configured to buffer data packets, a plurality of ports operable to receive data packets for writing to the common memory, and a memory manager, the method comprising:

storing in the memory manager information defining a plurality of virtual queues held in the common memory, wherein the memory manager is configured to associate one or more of the virtual queues with each port such that data packets received at a port are written to the one or more virtual queues associated with that port, wherein a linked logical sequence of buffers in said common memory represents each virtual queue;

receiving from the memory manager an indication of one or more buffers for each linked logical sequence of buffers representing a virtual queue; and     servicing the ports and writing data packets received at a respective port into the indicated one or more buffers of the linked logical sequence of buffers representing a virtual queue associated with that port.

* * * * *